(12) United States Patent
Barrett

(10) Patent No.: US 7,266,817 B1
(45) Date of Patent: Sep. 4, 2007

(54) METHOD AND SYSTEM FOR CREATING PACKAGES FOR MULTIPLE PLATFORMS

(75) Inventor: Derek Barrett, Carrigaline (IE)

(73) Assignee: EMC Corporation, Hopkinton, MA (US)

( * ) Notice: Subject to any disclaimer, the term of this patent is extended or adjusted under 35 U.S.C. 154(b) by 1043 days.

(21) Appl. No.: 09/747,737

(22) Filed: Dec. 21, 2000

(51) Int. Cl.
*G06F 9/445* (2006.01)
(52) U.S. Cl. .............. 717/174; 717/120; 717/121; 717/175; 717/177
(58) Field of Classification Search ........ 717/118–178; 714/38; 703/27
See application file for complete search history.

(56) References Cited

U.S. PATENT DOCUMENTS

| | | | | |
|---|---|---|---|---|
| 6,038,399 A | * | 3/2000 | Fisher et al. ................ | 717/178 |
| 6,347,397 B1 | * | 2/2002 | Curtis ........................ | 717/170 |
| 6,615,166 B1 | * | 9/2003 | Guheen et al. ............... | 703/27 |
| 6,907,546 B1 | * | 6/2005 | Haswell et al. ............... | 714/38 |
| 7,000,222 B1 | * | 2/2006 | Curtis et al. ................. | 717/118 |
| 2002/0124245 A1 | * | 9/2002 | Maddux et al. ............. | 717/176 |
| 2006/0179434 A1 | * | 8/2006 | Gruper et al. .............. | 717/178 |
| 2007/0067760 A1 | * | 3/2007 | Andrew et al. ............. | 717/143 |

\* cited by examiner

*Primary Examiner*—Meng-Al T. An
*Assistant Examiner*—Mark P. Francis
(74) *Attorney, Agent, or Firm*—K. Gupta; R. K. Perkins; C. A. Giordano

(57) ABSTRACT

A method and apparatus for creating installation packages for multiple different operating system platforms is provided. A distributed process is used to allow a user to create the installations packages from any location, with a minimal amount of steps. Upon the inputting of a few selected parameters, the process is able to obtain the information needed to build a package for the multiple different operating systems, and build a package that upon installation takes full advantage of functionality present in the multiple different operating systems.

5 Claims, 3 Drawing Sheets

METHOD AND SYSTEM FOR CREATING PACKAGES FOR MULTIPLE PLATFORMS

FIELD OF THE INVENTION

The invention relates generally to computer system administration, and more particularly to an automated process for creating software distribution media without having to have knowledge of the different utilities native to different operating systems.

BACKGROUND OF THE INVENTION

A UNIX® operating system, although a single computer operating system originally developed by Bell Laboratories and further refined at the University of California at Berkeley, also is sometimes used as a term for an entire family of operating systems and the most common programs or utilities of those operating systems. The reason for this may be historical. Since the source code of the early versions of UNIX was made generally available, different forms of UNIX began to evolve from the ones originally developed at the University of California. As is well known, some of the different versions of UNIX are specific to hardware manufacturers, while others arose from different sources.

Some of the most common versions of UNIX include HP-UX from the Hewlett-Packard Company, Solaris from Sun Microsystems, SVR4 from AT&T and AIX from International Business Machines (IBM). Other types of UNIX operating systems include SunOS, which was the predecessor to Solaris and Linux, the open source operating system.

When developers of application programs create their programs, they usually design their applications to work on or with a specified operating system. The operating system works in conjunction with the applications to handle all of the actions that can be made by the application. When there are multiple versions of UNIX, the developers of such software usually have to make certain that their applications work on one or more of the UNIX operating systems. The reason for this is simple. Customers of the applications may have servers that are operating one or more of the aforementioned different UNIX operating systems. When these customers acquire the applications they want to use, they want applications that run either on their already in use UNIX servers or they want to obtain applications that will work on one of the common UNIX operating systems mentioned above.

When applications are sold or distributed, they are, as is well known in the art, done on what is known as a distribution kit or installation media. The installation media is eventually used by system administrators to install the application software from the installation media onto the sever, which is running a particular UNIX operating system, and update the database of the operating system with information on the installed software. For example when certain information is available within the operating system, a system administrator may query the system and see what version of software is installed and by what vendor. Additionally an automatic uninstall option may also be provided, which removes the installed software and updates the operating system database accordingly. Installation media therefore, would, at a minimum, contain the application(s) acquired by the user and be ready to be installed on the user's servers, and as will be seen when native utilities are available, the aforementioned information is there to be used by the system administrator. However, creating installation media for applications where those applications are used on the different versions of the UNIX operating system can be both complex and difficult. As the contents of the installation media for each UNIX operating system has to in essence comply with the particular UNIX operating system, the simple creation of installation media for an application that can work with each one of the different UNIX operating systems can be a difficult and laborious task.

As is well known in the art, each UNIX operating system has a set of packaging utilities that are used to get the application onto installation media where a system administrator can then install it. The packaging utilities are unique to the particular UNIX operating system and are thus native to the operating system. Creation of installation packages for applications that run on these different types of operating systems is complicated.

It would be advantageous to have a simple automated system and method that can be used in the creation of installation media that makes use of native functionality provided by different UNIX packaging utilities.

It would also be advantageous to have a simple automated system and method, which utilizes the native functionality from the different operating systems without a user having to have knowledge of the native utilities.

It would also be advantageous to have a single system that can be used to create installation media for a variety of applications using different operating systems.

SUMMARY OF THE INVENTION

One illustrative embodiment of the invention is directed to a system to be used for packaging or building software applications that are eventually installed on installation media. The system is capable of building the software applications regardless of the particular operating system that the software application runs on. The system includes at least one predetermined parameter that corresponds to at least one element used by native utilities unique to a particular operating system, and a process which accesses the native utilities for the at least one operating system based on the at least one parameter.

Another illustrative embodiment of the invention is directed to a method for building or packing software applications, where the software application runs on one of many different operating systems. The method includes the acts of (a) determining the operating system on which the software application will operate; (b) providing the location of the files and directories which actually comprise the software application; and (c) providing a location on a computer where the files and directories will eventually be places and in response to steps (a), (b) and (c), utilizing a predetermined set of programs unique to the determined operating system in order to create a software package of being installed on installation media.

BRIEF DESCRIPTION OF THE DRAWINGS

The above and further advantages of the present invention may be better under stood by referring to the following description taken into conjunction with the accompanying drawings in which.

DETAILED DESCRIPTION OF THE PREFERRED EMBODIMENT

Figure 1:
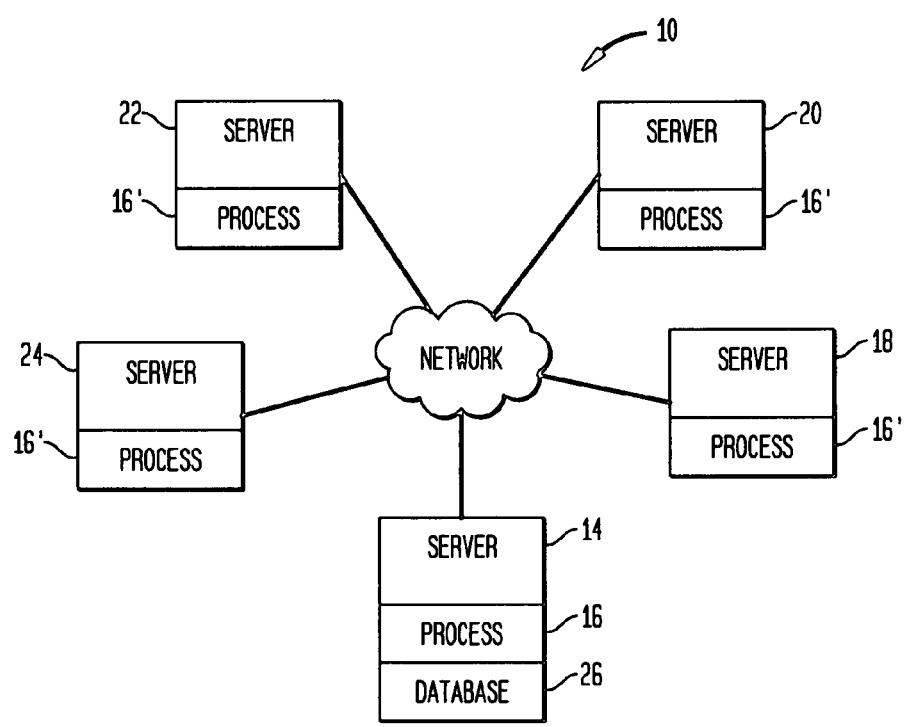
FIG. 1 is a block diagram showing the computer system used in accordance with the method and system of the present invention.

As is well known in the art, application programs or applications used on a server or computer running an operating system are delivered in units commonly called packages. Generally, an application performs a task or set of tasks. For example, well known application programs include, but are not limited to e-mail, spreadsheets, word processing programs, databases etc. A package usually refers to a collection of files and directories which when working together form a particular application. Usually the packages are built after the application code itself has been completed. The packages allow the application to be easily written to or transferred to the installation media (such as CD-ROMS, floppy disks etc.), so that it can be mass produced and eventually installed on a server by the entity that acquired or licensed the application. In order to package an application, the components that make up the application need to be created as well as any optional components. Once this is done, then the package can be built.

It should be understood that there exist a variety of operating systems that can run a server. It is common for the manufacturers of the servers to have their own operating systems. One set of well-known operating systems is sometimes referred to as UNIX. Although the term UNIX is often used to describe an operating system, in reality there are many different types of UNIX operating systems that usually are specific to the manufacturer of the server. For example, Sun Microsystems of Palo Alto, Calif. sells a series of servers that run the Solaris operating system. Other well known UNIX type of operating systems include the HP-UX which is part of servers manufactured by the Hewlett-Packard Company of Palo Alto, Calif.; AIX which is part of servers manufactured by International Business Machines (IBM) of Armonk, N.Y.; and SUR4 which is part of servers manufactured by AT&T of New York, N.Y. More recently an open source variation of UNIX termed Linux has also become popular. Applications, in order to work properly, must work in conjunction with the particular operating system. So when applications are packaged, in order for them to work with the designated operating system that will run the application, they must be packaged specifically for a particular operating system. With the variety of different operating systems available, it can be both burdensome and complex to package applications for this wide variety of operating systems.

There are two basic and traditional ways to package applications. The first is through the use of what is known as the tar utility. The second is through the use of what is known as native packaging tools. For the packager of applications, both have serious disadvantages.

The tar utility or command has traditionally been used for archiving and backing up files. It probably is the most common format in UNIX for performing tape and disk archives because it is simple and easy to use. It is easy to use for archiving and backup functions because it allows one to save to any medium (including installation media) because it treats file and backup media device targets the same. Also with the tar utility the user can specify the files and directories that the user wants to include or exclude. So in using the tar utility for packaging the user can "bundle" all of the desired files to a single file. The general format of the tar command is:

tar (options) (tarfile name) (filenames to backup, restore or bundle)

In order to then bundle the directories in a particular directory to an installation media you would use the following command:

tar cvf install_package.tar/usr/local/datafiles

Where cvf is the option for writing to a tarfile called install_package.tar, and /usr/local/datafiles represents all of the directories in a sample datafiles directory. This allows the selected files to be bundled to a single tarfile, eventually, an untar command needs to be run in order to release the selected datafiles to a target system such as follows:

tar-xvf install_package.tar

This is certainly not the only way to utilize the tar utility, but is shown for illustrative purposes.

This example does show some of the limitations of the tar utility. In using the tar utility as a bundling mechanism, the functionality provided by the native UNIX install programs is missing. For example, some of the functionality not available through the use of the tar utility includes the tracking the version of the software being packaged, obtaining logged information about the installation and having information about the removal of software. One of the problems that can arise from this lack of functionality is that a system administrator has no way of telling what version of software is installed when trying to diagnose problems with the software. The administrator also has to remember where the software was installed so that it can be removed. On large networks this is not ideal, as an administrator may have many servers where the servers are running different revision levels of software.

Use of the native UNIX installation tools does provide the aforementioned functionality, but comes with its own set of disadvantages. As will be seen it is not a simple task to learn and use the native install tools for one type of UNIX operating system, much less multiple UNIX operating systems. Additionally, the use of the native install tools requires the user to know both the syntax and formatting of the packaging utilities, which are unique to the different operating systems. Because the native tools do significantly differ from UNIX platform to UNIX platform, one is unlikely to find personnel who are well versed one the utilities of multiple UNIX platforms. Instead of explaining the native packaging tools for the variety of UNIX platforms, only one will be used for illustrative purposes. Solaris 2.5 uses the pkg set of utilities to create and install packages. In order to create packages using Solaris at least the following commands are used: pkgadd, pkginfo, pkgmk, pkgproto, pkgtrans and pkgrm. What follows are the basic steps required when creating a package using the Solaris native utilities. It should be understood that this is only meant to serve as a summary of a complex process and is being described to provide a greater understanding of applicant's invention.

Generally, the user first has to set up a directory structure in a chosen directory to contain the desired packages. Once the directory is chosen and the application (i.e. executable files) is installed into the chosen directory, the subdirectories need to be created. These will be the subdirectories, such as bin, lib etc. that will be needed by the application. The next step is to install the files of the application into the directory and subdirectories. Usually the application is compiled and run before the files are installed. These first two steps are really the preliminary steps to be taken before the native Solaris utilities can be used.

Next, a pkginfo file has to be created. The file is created in order to describe the characteristics of the application. This is done through the text editor by creating a file named pkginfo and then defining at least five parameters including pkg, arch, version, name and category. These parameters correspond to the name chosen for the package directory, the operating system version, the version number for the application, the name of the application and identifying that the program is an application.

After the pkginfo file is created, the contents of the package have to be organized. In other words the package objects are organized into a hierarchical directory structure that mimic how they should be organized on the target system after the application is eventually installed by the system administrator.

In Solaris, the next two steps are optional, but are often useful. They are creating information files and creating installation scripts. The former is used to define certain package dependencies, such as copyright messages and the reservation of additional space of a target system. The latter is used to customize the installation and removal processes of a package.

The next required step is the creation of a prototype file. The prototype file is an ACSII file used to specify information about the objects in a package. Each entry in the prototype file describes a single object such as a data file, directory or executable object. A prototype file may be created through the use of a text editor or through the use of the pkgproto command. Using the pkgproto command can be advantageous as the file is created based on the previously created directory hierarchy.

Once the objects are created and defined, the pkgmk command is used to actually build the package. The pkgmk command takes the objects, as defined in the prototype file, and puts them into directory format, and creates a file called pkgmap. This file replaces the prototype file Lastly, the now created package is verified and transferred to a distribution medium. This is done through a series of steps, including installing the package on a server with the use of the pkgadd command, verifying the integrity of the contents of the package with the pkginfo command, removing the package from the system with the pkgrm command and transferring the package, in the correct format, to a distribution (i.e. installation media) medium with the use of the pkgtrans command.

The just described package creation process for Solaris does not include all of steps within the larger steps. A more complete understanding of the Solaris package building process can be found at the web site http://docs.sun.com or in the reference manuals for the relevant operating system. In the Sun Microsystems example, only the steps for creating a package using the Solaris native utilities were described. Each one of the other UNIX operating systems such as HP-UX and AIX, all have their own native utilities for creating packages, and they differ significantly, making it very difficult for a single person to be able to build packages that take advantage of the functionality offered by the various native utilities.

The packager may be using the process of the present invention within a system 10 as shown in FIG. 1. The packager would be entering the necessary inputs (as will be explained) at computer or server 14 that contains the process 16. Server 14 may be part of a network 12 that includes servers or computers 18, 20, 22 and 24. The network could be any local area network (LAN) or wide area network (WAN) as is well known in the art. It is also contemplated that the network 12 could also be the internet and the servers shown could all be in different remote locations. The server 14 may also include an operating system database 26, which is used upon installation of the packages of the present invention to retain information concerning the package contents. This system 10 is shown, in this example, as having five servers, but this is simply for illustrative purposes, as the system 10 could have any number of servers. The servers 14, 18, 20, 22 and 24 can be running any one of the different UNIX operating systems. For example, server 14 could be running the Digital UNIX operating system; server 18 could be running the Solaris operating system; server 20 could be running the HP-UX operating system; server 22 could be running the AIX operating system and server 22 could be running the Linux operating system. The process 16 may interact with the other servers 18, 20, 22 and 24 as will be described in order to provide the completed package. The packager, without any knowledge of the native utilities on each of the servers 14, 18, 20, 22 and 24, can build packages that utilize the full native functionality inherent in each of the different operating systems without knowledge of that native packaging utilities. To do this, requires processes or agents 16' to reside on each of the servers 14, 18, 20, 22 and 24, wherein communication occurs between processed 16 and 16'. For example when process 16 is invoked without communication to the other severs, a package native to the operating system of server 14 can be built.

In another embodiment of the invention a master process 16 which, when appropriate will invoke or involve the other processes 16' on the other servers to obtain their native utility information. Processes 16 and 16' can communicate with each other across the network in a variety of ways well known in the art. In the present invention it is contemplated that sockets will be used to establish and maintain the connection between one or more processes. In this scenario, process 16, as the master process, would be responsible for accepting the inputs (as will be explained) from the user at server 14, and establishing a connection with another process in the network and issuing instructions to have that process build a package suitable for the operating system of the second process. This would be accomplished by the first process 16 recognizing that the operating system to be used is different than the one the process 16 is running on. Upon this recognition, the process would contact and establish a connection with a process 16' that uses the particular operating system as input by the user. In this scenario the inputs from the user into process 16 would be sent via the connection to the process 16' which upon receipt of the needed inputs would build the package. It is contemplated that process 16' could either complete the building of the package, including local loading on the package onto installation media or send the package over the network back to process 16, which could load the package onto the installation media. It is also contemplated that each process in itself is a master process, which will allow a user to use the process to build packages from any one of the servers in the system.

The present invention provides a simple, automated process for allowing a packager to take advantage of the functionality available from the native installation utilities without having to have knowledge of all of the native installation utilities for the different operating systems. Referring to Table 1, the user or packager only has to be aware of six (6) items

TABLE 1

| | |
|---|---|
| Application Source | This is the absolute path to the application source directory. All of the files and directories under this directory will eventually become part of the application |

TABLE 1-continued

| | |
|---|---|
| | distribution kit. |
| Application Target | This is the absolute path to the application target directory. |
| Application Name | This is the name of the application. |
| Application Sub Kit Name | This is the name used by an installation utility to identify the application product with the application kit. |
| Product Key | This is a three letter key that is associated with the application. This key is required in order to create software kits on certain UNIX operation systems (i.e HP-UX, AIX). |
| Application Version | This is the version of the application. |

It should be understood, that the packager, as was described above has to make certain that the desired files and directories are located in a particular directory structure, and that the application should have been compiled and run and then installed into the directory which is known as the source directory. Once the package is built, it is copied to a directory specified by the target directory. If this directory does not exist, then it is created as part of the packaging process. The packager also needs to know what the name of the application is as well as the application sub name. There may also need to be a three letter key that represents to certain of the native install utilities information concerning the application. Lastly, the particular version of the application kit needs to be known so that the correct version is what is packaged.

Figure 2:
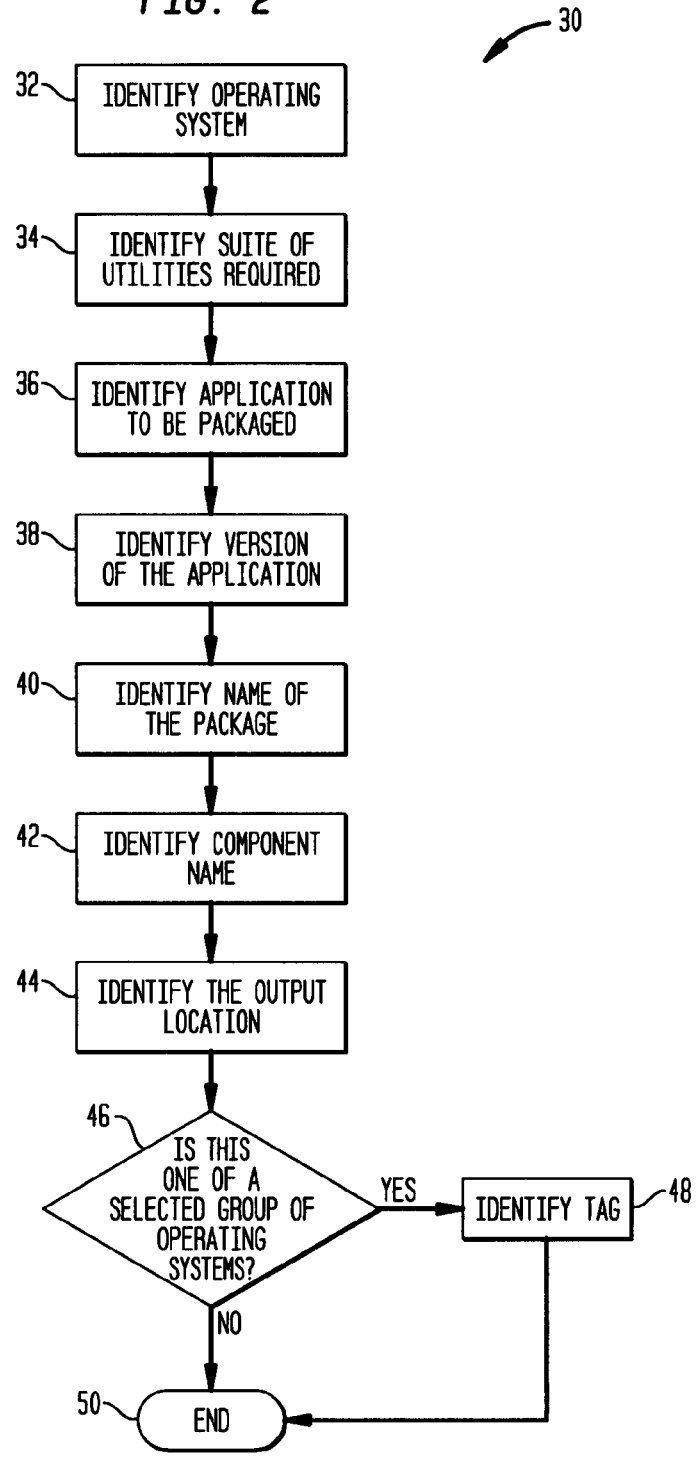
FIG. 2 is a flow chart showing the operation of the method of the present invention.

Turning to FIG. 2, a flow chart 30 is shown of the steps that are needed by the automated process 16 of FIG. 1 in order to begin the process of building a package. At step 32, the process identifies the server's operating system. In other words the process asks or polls the operating system as to its identity. Once the process has detected the operating system that is being used, it identifies the suite of utilities that will be used to build the package at step 34. This works when the user is aware that the package to be built is going to utilize the native utilities on the server that the user is actually using to build the package. For example, if the operating system is detected as being a Solaris, the process will identify the utilities needed in Solaris to build the package. As mentioned previously, if the operating system is a Solaris, the process will identify the pgk utility which includes the programs pkgadd, pkginfo, pkgmk, pkgproto, pkgmap and pkgtrans etc. that are needed. It should be understood that the Solaris utilities mentioned are meant to serve as an example of the native programs used to create or package the application kits. The present invention contemplates using all of the available and necessary programs that are used with the utility or utilities provided by the particular UNIX operating system. If however, the user is on, for example, the Solaris server, but wishes to build a package using the HP-UX utilities, the user will need to input that information into the process. It is contemplated, that once the system identifies itself, and additional step could take place where the process confirms with the user that the local operating system is the one the user wishes to use. If not, the user, as stated above, could input the desired operating system information.

At step 36, the application that is to be packaged is identified. For example, if the packager is packaging an e-mail application, here that identification is done by identifying the path to the source directory in which the files and directories of the e-mail application reside. It should be understood that this path could be local to the server, or remote from the server at another location in the network. At step 38, an identification is done of the particular version of the application that is going to be packaged and eventually installed. An application program, as is well known in the art, is identified by version numbers represented typically by an x.xx.xx sequence. The first x to the left of the first decimal point represents a major version of the application, the two xx to the right of the first decimal represent the releases of the major version, and the two xx to the right to the second decimal represent the patches for the release. If the version is 4.08.05, that means this would be version 4 for the application, which has had five releases and that release has had 3 patches. At step 40, the name of the package is identified. This would be the name that is desired for the package to be termed. Using the previous example, if an e-mail application called "e-mail" is being packaged, this could be identified by "e-mail." Once the package is actually put together by the utilities, it needs to be stored in an output directory where it can easily be transferred onto the installation media. In addition to providing the name of the application, the component name is also identified at step 42. This name is used by the package and install utilities in the applicable native utilities to identify the components of the application. Some examples of this would be the client, server and common components that that are eventually bundled together to create the master bundle or complete. This enables an application to broken into its component parts, thus allowing for flexibility at install time. An administrator may wish to install an application in part, due to space or user restrictions. Typically, an administrator will install the complete application on one machine (the server) and part of the application on many machines (clients). The packaging of an application into its component parts enables an administrator to do this. At step 44, the output location is identified by providing a path to the output or target directory. An example output location would be /opt/pkg.

Figure 3:
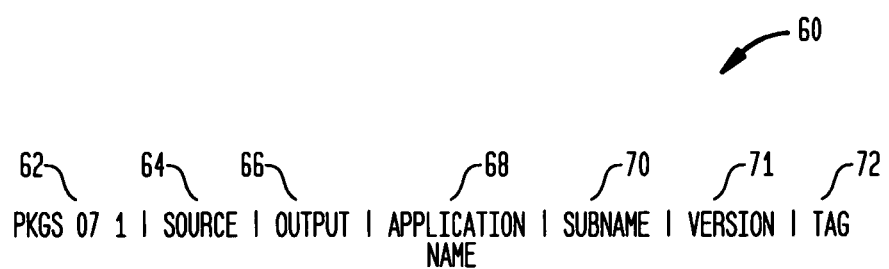
FIG. 3 is a diagram showing the inputs used by the method and system of the present invention.

On certain UNIX operating system such as HP-UX and AIX a three letter key is needed to package application kits on these systems. Therefore, if the operating system in step 32 is one of these platforms, the method does not end at step 46, but continues on to step 48 where this three letter tag or key is identified. Although the tag is used on HP-UX and AIX systems only, the user enters the tag. This tag is discarded by the process if the packaging is for system other than HP-UX or AIX. One of the objectives is to provide the additional functionality delivered by the native utilities while still being easy to use. The inputs or parameters needed to effectuate the process of FIG. 3 may be inputted in a variety of ways. Referring to FIG. 4, the parameters may be input from a command line with the format 50 shown in FIG. 4. Pkgsoft 52 represents the process or utility run in order to package all the software contained in a specified directory into a distribution kit. In the preferred embodiment of the invention Pkgsoft is the name given to this process, but any name could be used. At 54 an absolute path to the directory containing all the application is provided. The directory listed in 54 will contain all of the files, directories and libraries necessary to form the application. For example the syntax for the source 54 could be:

/usr/local/src/ift

Thus, the software to be packaged will be all of the software contained into the above directory. Any files or directories contained within /usr/local/src/ift will be packaged. Note that the file and directory structure under /usr/local/src/ift will be maintained. When the package is installed, the structure will be identical to that under /usr/local/src/ift. Also required is an output or target directory 54.

This is where, once packaged, the utility stores the packaged application. The syntax for the output could be:

/usr/output

At 58, the application kit name is a required field. Before the application is packaged, it needs to have a name. The application is thus packaged into an application kit with the name provided in field 58. Field 60 represents the application sub name. This is the name used by the install utility (i.e. pkgadd) to identify the application product when the application is being installed. This name is also used by the operating system to identify the software when a user queries the system for installed software. The field at 62 is to identify the version of the application as previously mentioned. Lastly, at field 64, the three letter key or tag can be inserted, when applicable, to create application kits for certain UNIX systems. In summary all of the software contained in the source directory 54 is packaged into an application kit named at 58 and stored in the directory identified at 56. When a user installs the named application kit, the operating system identifies and stores the application product having the named version number.

Although in the preferred embodiment of the invention a command line interface is shown as the means to input the parameters, it is contemplated that other means such as a graphical user interface (GUI) could also be used to input the parameters. This could be done either by having a GUI prompt the packager for specific fields or by simply providing a graphical method versus a command line method for inputting the parameters. It can be seen then how a packager can derive the functionality contained in the native installation utilities without having knowledge of those utilities with the ease provided by the tar operation.

Although the described invention is shown using UNIX operating systems it is contemplated that the present invention can be used with any number of various applications in which a defined set of parameters can allow a process recognize certain key elements and commence a set of activities.

Having described a preferred embodiment of the present invention, it will now become apparent to those of skill in the art that other embodiments incorporating its concepts may be provided. It is therefore felt that this invention should not be limited to the disclosed embodiment, but rather should be limited only by the spirit and scope of the appended claims.

The invention claimed is:

1. A system for creating packaging applications that operates on an operating system, the system operable on a computer system, comprising:
   means for determining the operating system on which the packaging applications will operate;
   means for providing at least one parameter corresponding to at least one element used by native utilities on the determined operating system, wherein the at least one parameter;
   identifies the location of the packaging application prior to the application being packaged,
   identifies where the packaging application is to be placed after it has been packaged,
   identifies a name for the packaging application,
   identifies an identifier used by said native utilities in order to identify the packaging application for use by said native utilities,
   specifies an identifier unique to the determined operating system; and
   identifies the particular version of the packaging application that is to be packaged; and
   accessing the native utilities of the determined operating system based on the at least one parameter, said native utilities being used for creating said packaging application.

2. The system of claim 1, wherein the at least one parameter is inputted to the process by a command line.

3. The system of claim 1, wherein the at least one parameter is inputted to the process by a graphical user interface.

4. The system of claim 1 further comprising:
   a plurality of computers connected to each other by a network, wherein the process resides on at least one of the computers and said process establishes a communication with a second process residing on another one of the at least one of the computers to enable the first process to be used to allow the second process to create a software package utilizing the operating system native to the computer containing the second process.

5. A method for building software packages that operate on an operating system comprising the steps of:
   determining the operating system on which the software package will operate;
   utilizing a set of programs unique to the determined operating system in order to create said software package, wherein at least one unique identifier of the software and components of the software are provided to the set of programs, said unique identifier;
   identifies the location of the packaging application prior to the application being packaged,
   identifies where the packaging application is to be placed after it has been packaged,
   identifies a name for the packaging application,
   identifies an identifier used by said native utilities in order to identify the packaging application for use by said native utilities,
   specifies an identifier unique to the determined operating system; and
   identifies the particular version of the packaging application that is to be packaged.

* * * * *